Aug. 14, 1951     H. D. COLMAN     2,564,324
CLUTCH AND CONTROL MECHANISM THEREFOR
Original Filed July 19, 1940
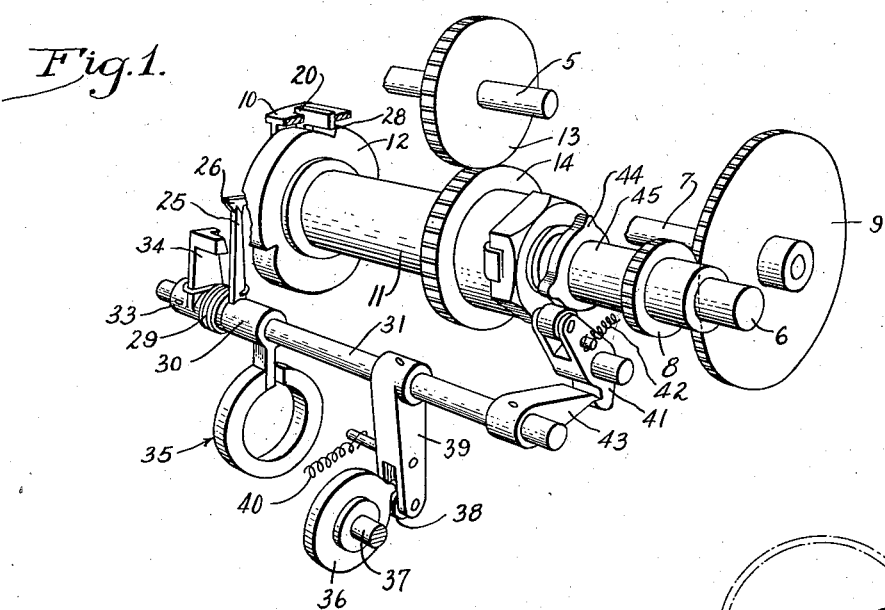
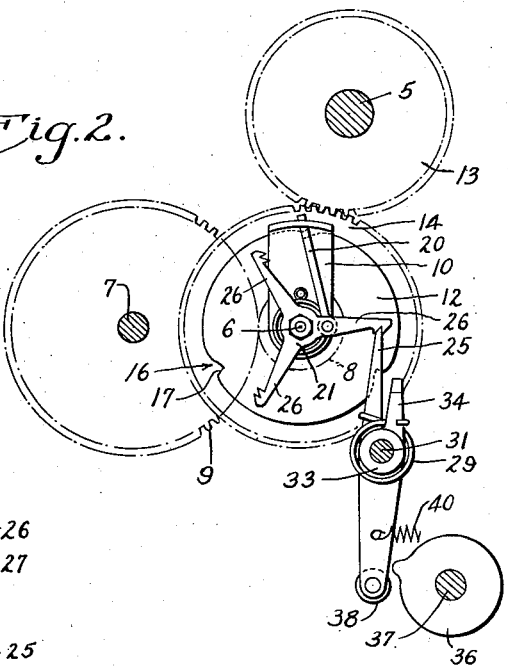
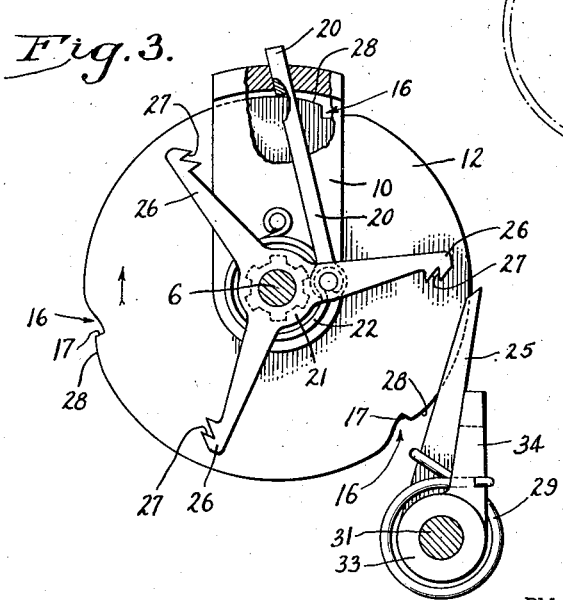
INVENTOR.
Howard D. Colman-Deceased
Harry A. Severson-Executor
BY
ATTORNEYS Patented Aug. 14, 1951

2,564,324

UNITED STATES PATENT OFFICE 2,564,324

CLUTCH AND CONTROL MECHANISM THEREFOR

Howard D. Colman, deceased, late of Rockford, Ill., by Harry A. Severson, executor, Rockford, Ill., assignor to Barber-Colman Company, Rockford, Ill., a corporation of Illinois Original application July 19, 1940, Serial No. 346,285. Divided and this application January 15, 1948, Serial No. 2,417

13 Claims. (Cl. 192—28)

The invention relates to clutches and control mechanisms therefor and more particularly to clutches of the positive drive type.

One object of the invention is to provide an improved clutch and control mechanism by which the establishment of a connection between driving and driven members, while initiated by an element operated at random intervals, is accurately synchronized with the cyclic operation of the driving member.

Another object is to provide a detent controlled, positively acting clutch mechanism embodying novel means for latching the detent in clutch disengaging position and for periodically releasing it for withdrawal in timed relation to the rotation of the driving clutch member.

Still another object is to provide novel clutch control mechanism which may be actuated for effecting engagement of the clutch in any position of the clutch driving member but which becomes operative only in predetermined angular positions of the member.

Other objects and advantages of the invention will become apparent from the following detailed description of the preferred embodiment illustrated in the accompanying drawing, in which:

Figure 1 is a perspective view of a clutch and control mechanism embodying the features of the invention.

Fig. 2 is an end view of the clutch and control mechanism showing the clutch disengaged.

Fig. 3 is an end view of the clutch control mechanism showing the detent withdrawn to clutch engaging position.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

This application is a division of the copending application of Howard D. Colman, Serial No. 346,285, filed July 19, 1940, for an Automatic Multiple Stage Telegraph System, now Patent No. 2,472,885, issued June 14, 1949. The improved clutch and control mechanism constituting the invention, although not limited to such use, is shown herein as employed for driving the chain advance mechanism of a signal recorder arranged for the reception of signals through a start-stop receiver. In such recorders, the chain advance mechanism is operated in cycles accurately timed with respect to the operations of other recorder elements, usually from a continuously running constant speed drive shaft. Start-stop receivers on the other hand are adapted to receive signals at random intervals. In this environment the improved control mechanism automatically and invariably effects clutch engagement at the proper point in the recorder cycle in response to the random reception of signals by the receiver.

In the embodiment shown in the drawing, the clutch is utilized to connect a driving element or shaft 5 which may be the main drive shaft of the recorder with a driven element or shaft 6, which, in this instance, is arranged to drive a shaft 7 of the chain advance mechanism through the medium of a pinion 8 and gear 9. The shafts are journaled in suitable bearings (not shown) carried by the framework of the apparatus with which the clutch is associated.

The clutch has suitable driving and driven members, the latter comprising an arm 10 fast on the shaft 6 and projecting radially therefrom. The driving member of the clutch is fast upon a tubular shaft or sleeve 11 and, in the present instance, comprises a disk 12 disposed adjacent the arm 10. The sleeve 11 is driven from the main shaft 5 through the medium of a pinion 13 and gear 14. As shown in Fig. 3, the disk 12 is formed with one or more peripheral tooth depressions or notches 16 with abrupt radially disposed shoulders 17 facing in the direction of rotation of the disk. Three such shoulders are provided in the present instance so that the shaft 6 may be started in any one of three angular positions of the driving member 12.

Connection and disconnection of the driving and driven clutch members are effected by a connecting element held against circumferential movement relative to the driven member and mounted thereon for movement into or out of the path traversed by the shoulders 17 in the rotation of the driving member. In the present instance, the connecting element is in the form of an L-shaped bolt 20 having its shank portion slidably supported and guided by the arm 10 adjacent one face of the disk 12 and its end portion overlying the periphery of the disk. As shown in Fig. 3, the shank of the bolt 20 is inclined slightly with reference to the radius of the disk 12 and is pivotally connected to a lever 21 mounted on the shaft 6 for limited angular movement relative thereto. A torsion spring 22 urges the lever in a clockwise direction as viewed in Fig. 3, thus tending to draw the bolt 20 downwardly and entering its upper end portion in the notches of the disk 12.

The bolt 20 of the clutch is adapted to be shifted to a disengaged position and held there by a detent 25 movable into or out of the path of any one of a plurality of radially projecting control elements herein shown as fingers 26 formed integrally with the lever 21. In the exemplary clutch there are three clutch fingers, one for each notch in the driving disk 12. When a finger is blocked by the detent, continued rotation of the shaft 6 through a small angle is effective to lift the bolt 20 out of the notch in the driving disk and thereby interrupt the driving connection for the shaft. When the detent is withdrawn from the path of the clutch finger 26, the spring 22 acts to swing the lever (clockwise as viewed in Fig. 3) and thus reenter the bolt in a notch in the disk.

In accordance with the invention, means is provided for withdrawing the detent 25 to engage the clutch in timed relation to the rotation of the drive shaft 5, that is, in synchronism with the operation of the apparatus driven by the shaft although such withdrawal is controlled by a condition timed at random with the rotation of the drive shaft. In the particular apparatus illustrated, the condition initiating withdrawal of the detent 25 is the reception by the signal receiving mechanism of an incoming signal, which, of course, is received at random with respect to the cyclic operation of the recorder. To this end, provision is made for positively retaining the detent 25 in blocking relation to the active clutch finger 26 except for short intervals when the driving member of the clutch is in predetermined angular positions and means is provided for storing power incident to the occurrence of a detent withdrawing condition for effecting the withdrawal in the succeeding one of such intervals.

For positively retaining the detent 25 against withdrawal, the cooperating ends of the clutch fingers 26 and the detent are arranged for interlocking engagement, in this instance by forming each of the clutch fingers 26 with a notch presenting an abrupt shoulder 27 adapted to be interposed in blocking relation to the free end of the detent 25. Thus when the tip of the detent is engaged in the notch, movement of the detent to clutch engaging position or clockwise, as viewed in Fig. 3, is effectually prevented. On its inner face, the tip of the detent 25 is beveled and the outer end of each clutch finger is similarly beveled so that the fingers may be cammed upwardly to permit the detent to enter the notch on the finger when it is returned to clutch disengaging position.

To relieve the detent 25 for withdrawal during the intervals above referred to and at the proper points in the cycle of the apparatus, the interlocking engagement between the detent and the associated clutch finger is interrupted periodically, in this instance, by cam surfaces 28 on the periphery of the disk 12. The cam surfaces are positioned to engage the overlying portion of the bolt 20 following the passage of each of the notches 16 and rock the lever 21 to retract or lift the clutch finger out of engagement with the detent.

To permit the detent 25 to be conditioned for withdrawal from blocking relation to the clutch finger 26 at any time in the recorder cycle, the detent 25 is subjected to the action of a spring 29 energized in response to the random detent withdrawing condition, such as the reception of a signal. In the construction shown, the detent 25 is formed with a hub portion 30 rotatably mounted on a detent actuating rockshaft 31 supported on the framework of the apparatus and extending generally parallel to the shaft 6. The spring 29, herein shown as a torsion spring, is connected at one end to the detent 25 and at the other to a collar 33 pinned to the shaft 31, thereby providing a yieldable connection between the shaft and the detent and constraining the detent to rock with the shaft. Preferably, the collar 33 is formed with a generally L-shaped arm 34 which serves as a backstop for the detent. A magnetic set device 35 of conventional construction is arranged to releasably hold the detent in either its entered or withdrawn positions.

In the exemplary embodiment, the shaft 31 is rocked to operated or detent withdrawing position and thereby stores power in the spring 29 in response to the random incoming signal through the medium of a cam 36 fast on a cam shaft 37 forming a part of the start-stop receiver. The cam 36 is arranged to coact with a follower roller 38 carried on a crank arm 39 fast on the shaft 31. A spring 40 acting on the arm 39 tends to return the shaft to detent entering position, the detent of course moving with the shaft through the action of the back stop arm 34.

As shown in Fig. 1, the cam 36 has a single lobe positioned to momentarily engage the follower roller 38 in each revolution of the shaft 37 and thus rock the shaft 31 to the position shown in Fig. 2. As the timing of the cam 36 is at random with respect to the timing of the apparatus driven by the shaft 5, means is provided for holding the detent shaft 31 in operated position and thus maintaining the spring 29 under tension independently of the cam 36 until the clutch finger 26 is retracted to release the detent 25. Preferably, this is accomplished by a pivoted latch 41 urged by a spring 42 into engagement with a latch member or finger 43 fast on the shaft 31.

The rocking of the shaft 31 to operated position as above described tensions the spring 29 sufficiently to overcome the pull of the magnetic set device 35 when the clutch finger 26 is lifted by the cam surface 28 out of engagement with the tip of the detent 25. The detent is then quickly rocked to its withdrawn position by the spring 29 as shown in Fig. 3, and the clutch bolt 20 is permitted to drop into a notch in the disk 12 as soon as the notch is presented thereto. The entry of the bolt 20 in one of the notches 16 completes the driving connection between the driving member 12 of the clutch and the driven member 10 and the shaft 6 is thus rotatably driven.

In order to disengage the clutch at the end of each operating cycle, the detent 25 must be returned to normal rest position in time to effect withdrawal of the clutch bolt. To this end, the latch 41 is withdrawn through the action of a three-lobed cam 44 which in this instance is formed on or rigidly secured to the hub portion 45 of the pinion 8. The cam is timed so that the latch 41 is disengaged and the detent shaft is fully restored by the action of the spring 40 before the clutch driving member completes a third of a revolution. In this movement of the shaft, the arm 34 breaks the holding action of the magnet 35 and cams the detent 25 along with it thus positioning the detent to block the next clutch finger and disengage the clutch at the end of the cycle which, in this instance, requires revolution of the shaft 6 through one-third of a revolution.

From the foregoing it will be apparent that the invention provides novel clutch and control mechanism therefor whereby the engagement of a positive drive clutch in synchronism with other continuously operating elements with which it is associated may be effected by control means whose operation is timed at random with respect to the timing of the apparatus. The provision of the means for restraining the clutch controlling detent against withdrawal except at predetermined points in the operating cycle of the apparatus in combination with the arrangement for actuating the detent by power stored in a spring permits the control mechanism to be conditioned for detent withdrawal at any time in the cycle of the apparatus while the actual withdrawal of the detent is effected at precisely the proper point in the cycle.

What is claimed is:

1. In a clutch mechanism having a driving member and a driven member, the combination with a control finger carried by the driven member, a detent movable into or out of blocking relation to said finger, said finger acting when blocked by the detent to disengage the driving and driven members and acting when the detent is withdrawn to effect a driving engagement of the members, detent withdrawing means, means on said finger tending to hold said detent in blocking relation to the finger irrespective of the operation of said detent withdrawing means, and means for periodically actuating the finger to disable said holding means so as to permit withdrawal of the detent by said withdrawing means when operated.

2. In a clutch mechanism having a driving member and a driven member, the combination with a control finger carried by the driven member, a detent movable into or out of blocking relation to said finger, said finger acting when blocked by the detent to disengage the driving and driven members and acting when the detent is withdrawn to effect a driving engagement of the members, means operable to yieldably urge said detent out of blocking relation to the finger, means on said finger tending to hold the detent in the finger blocking position against the action of said yieldable means, and means for periodically disabling said holding means to permit said yieldable means to withdraw the detent from the blocking position.

3. In a clutch mechanism having rotatable driving and driven members, a control element rotatable with the driven member, said element acting when blocked against rotation to disengage the driving and driven members and acting when released for rotation to establish a driving connection between the members, means for blocking and releasing said element including a rockshaft disposed at one side of the driven member, a detent rotatably mounted on said shaft for movement into or out of blocking relation to said control element, spring means interposed between said detent and said shaft constraining the detent to rock with the shaft, means operative when said detent is positioned to block said element for rocking said shaft in a direction to withdraw the detent, cooperating means on said detent and said control element normally operative to restrain the detent against movement with said shaft whereby said spring means is tensioned, and means for periodically retracting said control element to release said detent for withdrawal by said tensioned spring means.

4. In a clutch mechanism having rotatable driving and driven members, a control element rotatable with the driven member, said element acting when blocked against rotation to disengage the driving and driven members and acting when released for rotation to establish a driving connection between the members, means for blocking and releasing said element including a rockshaft disposed at one side of the driven member, a detent rotatably mounted on said shaft for movement into or out of blocking relation to said control element, spring means interposed between said detent and said shaft constraining the detent to rock with the shaft, means operative when said detent is positioned to block said element for rocking said shaft in a direction to withdraw the detent, means normally operative to restrain the detent against movement with said shaft whereby said spring means is tensioned, and means for periodically disabling said restraining means in timed relation to the rotation of the driving clutch member.

5. In a clutch mechanism having rotatable driving and driven members, a control element mounted on and rotatable with the driven member, said element acting when blocked against rotation to disengage the driving and driven members and acting when released for rotation to establish a driving connection between the members, means for blocking and releasing said element including a rockshaft biased to a normal rest position, a detent rotatably mounted on said shaft for movement into or out of blocking relation to said control element, spring means constraining said detent to rock with said shaft, coacting means on said detent and said control element normally restraining said detent against movement with said shaft, means for rocking said shaft to tension said spring means, latch means for retaining said shaft in operated position, means for periodically retracting said control element to release said detent for withdrawal by said spring means, and means operating in timed relation to the retraction of said control element for releasing said latch means to permit the return of said rockshaft to its normal rest position.

6. In a clutch mechanism having rotatable driving and driven members, a control element mounted on and rotatable with the driven member, said element acting when blocked against rotation to disengage the driving and driven members and acting when released for rotation to establish a driving connection between the members, means for blocking and releasing said element including a rockshaft biased to a normal rest position, a detent rotatably mounted on said shaft for movement into or out of blocking relation to said control element, spring means constraining said detent to rock with said shaft, means normally restraining said detent against movement with said rockshaft, said shaft when rocked to an operated position serving to tension said spring, latch means for retaining said shaft in operated position, means for periodically disabling said restraining means to permit withdrawal of said detent by said spring means, and other means operating in timed relation to the withdrawal of said detent for releasing said latch means.

7. The combination with a clutch having a continuously rotating driving member, a driven member and a control element rotatable with the driven member adapted when blocked against rotation to disengage the driving and driven members and when released for rotation to establish a driving connection between the members, of a detent adapted to cooperate with said control element, a rockshaft supporting said detent for movement into or out of blocking relation to said control element, spring means constraining said detent to rock with said shaft, yieldable means normally maintaining said shaft in a position to interpose said detent in blocking relation to said control element, means restraining said detent against withdrawal except at predetermined points in the rotational cycle of the driving member, and means operated at random intervals for rocking said shaft to detent withdrawing position, said spring means being tensioned by the rocking movement of said shaft to effect withdrawal of said detent at one of said predetermined points.

8. The combination with a clutch having rotatable driving and driven members, of a detent shiftable between two positions to effect engagement and disengagement of the members, spring means associated with said detent, means operated at random to tension said spring means for shifting said detent from clutch disengaging position to clutch engaging position, means acting to positively retain said detent in clutch disengaging position against the action of the tensioned spring means, and means operative in timed relation to the rotation of the driving clutch member for disabling said retaining means to free said detent to the action of said spring means.

9. The combination with a clutch having rotatable driving and driven members, a detent shiftable between two positions to effect engagement and disengagement of the members, power actuated means timed at random with respect to the rotation of the driving clutch member for shifting said detent from clutch disengaging position to clutch engaging position, means acting to positively retain said detent in clutch disengaging position, means for storing the power generated by said power actuated means while said detent is retained in clutch disengaging position, and means operated in timed relation to the rotation of said driving clutch member for releasing said detent for movement to clutch engaging positions by such stored power.

10. The combination with a clutch having rotatable driving and driven members, of a control element normally operative to maintain the members disengaged, power actuated means timed at random with respect to the rotation of the driving clutch member, means for storing power generated by said power actuated means, and means acting in timed relation to the rotation of the driving clutch member for rendering said control element operative under the action of such stored power to effect the engagement of the clutch members.

11. The combination with a clutch having rotatable driving and driven members, a continuously operated driver for the driving member, control means operative to maintain the members disengaged, power actuated means operated at random with respect to the operation of said driver for conditioning said control means for engaging the clutch members, and means for rendering the conditioned control effective to engage the clutch members in timed relation to the operation of said driver.

12. The combination with a clutch having rotatable driving and driven members, a continuously operated driver for said driving member, a control element rotatable with said driven member operative when blocked against rotation to disengage the members and when released to effect the engagement of the members, detent means disposed in the path of said control element to block the element against rotation, means for withdrawing said detent to release said element for engaging the clutch members, means operated at random with respect to the operation of said driver for conditioning said detent withdrawing means for operation, and means for initiating the operation of said detent withdrawing means in timed relation to the operation of said driver.

13. The combination with a clutch having rotatable driving and driven members, a continuously operated driver for said driving member, a control element rotatable with said driven member operative when blocked against rotation to disengage the members and when released to effect the engagement of the members, detent means disposed in the path of said control element to block the element against rotation, detent withdrawing means, power actuated means operated at random with respect to the operation of said driver for energizing said detent withdrawing means without effecting withdrawal of said detent, and means for initiating the operation of the energized detent withdrawing means to effect withdrawal of said detent in timed relation to the operation of said driver.

HARRY A. SEVERSON,
*Executor of the Estate of Howard D. Colman, Deceased.*

REFERENCES CITED

The following references are of record in the file of this patent:

UNITED STATES PATENTS

| Number | Name | Date |
| --- | --- | --- |
| 787,138 | Wehrlin | Apr. 11, 1905 |
| 1,737,907 | Arnold | Dec. 3, 1929 |
| 2,049,690 | Cunningham | Aug. 4, 1936 |
| 2,472,885 | Colman | June 14, 1949 |